FIP8102 OR 3,123,773 220E ...H ROOM

INVENTOR
Joseph H. Vogelman
BY
BERNARD OLCOTT
ATTORNEY

INVENTOR
Joseph H. Vogelman
BY
BERNARD OLCOTT ATTORNEY

United States Patent Office 3,123,773
Patented Mar. 3, 1964

3,123,773
METHOD AND APPARATUS FOR PREDICTING RADIO FREQUENCY INTERFERENCE
Joseph H. Vogelman, 48 Green Drive, Roslyn, N.Y.
Filed Jan. 30, 1962, Ser. No. 169,808
28 Claims. (Cl. 325—67)

This invention relates to method and apparatus for predicting radio frequency interference in a plurality of receivers by a plurality of transmitters.

Generally, interference between electronic components in the same or intercoupled systems often renders equipment inoperative or malfunctioning, at least to some degree.

Concentration of transmitting and receiving equipment and gear within a limited geographical area poses the problem of interference at each device capable of response by each device capable of transmitting a signal. The coupling between each transmitting device and each receiving device, hereinafter referred to is a transmitter-receiver pair, may be either by conduction or by a radiation field. The problem takes on sizeable proportions when it is considered that each transmitter and each receiver are tunable over a range of frequencies, having first (or fundamental) and higher order frequency characteristics and spurious frequency characteristics associated with each fundamental and higher order harmonic. Additionally, each transmitter and receiver may have various and different time schedules of operation and directional antennas which may or may not be rotating at different speeds, or at the same speed with different orientations.

According to the invention, radio frequency interference is predicted in a plurality of receivers by a plurality of transmitters by eliminating transmitter-receiver pairs which do not have a corresponding frequency, within a predetermined tolerance, between one harmonic of the transmitter (which may be the first-or fundamental-, second, third, etc.) and one harmonic of the receiver (which may be the first-or fundamental-, second, third, etc.) of each of the pairs and determining the severity of the interference between the pairs which are not eliminated.

As contemplated, the elimination operation and the determination operation is performed on the transmitter-receiver pairs with respect to combinations of one frequency of the transmitter and one frequency of the receiver with due recognition being given to the fact that each transmitter has a fundamental or first harmonic frequency which is adjustable over a range of frequencies and has associated spurious frequencies therewith and with at least the lower order of harmonics of the transmitter fundamental. Also that each receiver has a first harmonic frequency response characteristic which is tunable over a range of frequencies and has associated image response and spurious frequency response therewith and with at least the lower order harmonics of the receiver fundamental.

Other objects and features of the present invention will be set forth or apparent in the following description and claims and illustrated in the accompanying drawings, which disclose by way of example and not by way of limitation, in a limited number of embodiments, the principal of the invention and structural implementations of the inventive concept.

In the drawings, in which like reference numbers designate like components in the several views.

In the specification and claims, the term $n$ will refer to the order of harmonics 1, 2, 3 . . . $n$ and the terms $m$, $g$, $b$ and $h$ will be used as a convenience to denote integers or numbers required by formulas to yield significant values for specific equipment having responses to specific harmonics.

Figure 1:
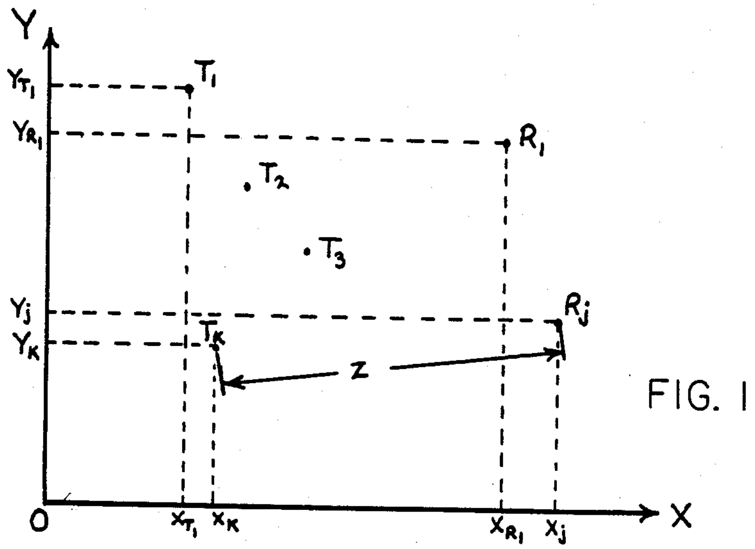
FIG. 1 is a geographic plan view of a plurality of transmitters which may produce radio frequency interference in any one of a plurality of receivers.

FIG. 1 illustrates the geographic locations relative to origin O and coordinates X and Y of a plurality of transmitters $T_1(x_{T1}, y_{T1})$, $T_2$, $T_3$, . . . $T_K(x_k, y_k)$, a plurality of receivers $R_1(x_{R1}, y_{R1})$, $R_2$, $R_3$ . . . $R_j(x_j, y_j)$. Simply stated, the problem is which transmitters will produce radio interference in specific receivers (or which are the transmitter-receiver interfering pairs) and how severe is the radio interference expected to be.

It is to be understood that the coupling between the transmitter-receiver pairs may be by conduction or by radiation field. Furthermore, that the transmitter need not necessarily be a conventional transmitter but rather any source of signal such as a fluorescent fixture, an ignition system, an electric motor, an X-ray machine, etc. Also that the receiver need not necessarily be a conventional receiver but rather any device susceptible or responsive to a signal such as a neon bulb, an electroexplosive detonator, a control valve in a telemetry network, etc.

Each of the transmitters $T_1$, $T_2$, $T_3$, . . . $T_K$ radiates power at a 1st harmonic (or fundamental frequency), at 2nd and higher order harmonics and at various spurious frequencies. In actual practice, it has been found that the harmonics above the 8th can usually be ignored. Each transmitter is tunable over a band of frequencies and has its associated IF bandpass or informational bandwidth.

Each of the receivers $R_1$, $R_2$, $R_3$ . . . $R_j$ is tunable over a band of frequencies, normally has an assigned operational frequency, an image frequency associated with the fundamental and harmonics and various spurious sensitivity frequencies.

The first step in the practice of the invention is to eliminate transmitter-receiver pairs which can not interfere as determined by frequency considerations. Such frequency screening is effected by taking the difference between a frequency associated with a receiver and, in succession, all those associated with all transmitters. Each difference is compared with the total spectrum "occupied" by the two in the neighborhood of the two frequencies; if the difference is the smaller, the two are designated a possible interference pair for the indicated frequency. This process is described by the following mathematics:

For the transmitter, let—

$f_{Tm}$: Maximum modulating frequency in megacycles per sec.

$f_{TK}$: Assigned operational frequency in megacycles per sec. If unknown, assume it to be the center frequency of the transmitter's tunable band.

$B_{TK}$: Nominal signal bandwidth. If unknown, assume; for A.M., $2\times f_{Tm}$; for F.M., $5\times f_{Tm}$ and for P.M. (pulse modulation), 2/H.

$L_{TK}$: Width of tunable band. Assume to be zero if assigned operational frequency is known.

$P'_{TK}$: Nominal power output; watts.

H: Pulse length, for P.M. transmitter; microseconds.

For the receiver, let—

$f_{Rj}$: Assigned operational frequency. If unknown, assume it to be the center frequency of the receiver tunable band.

$f_{RIFj}$: Center frequency of IF passband.

$B_{RIFj}$: IF bandpass.

$L_{Rj}$: Width of tunable band. If assigned operational frequency is known, assume such width to be zero.

Figure 2A:
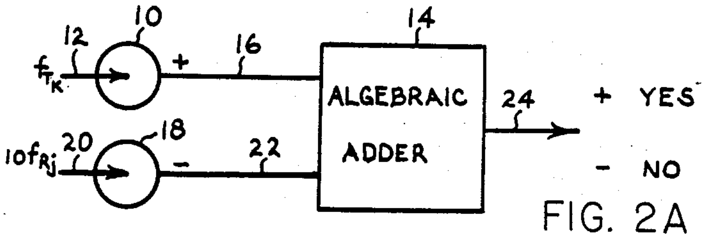
FIG. 2A is a block diagram of a first preliminary test to eliminate transmitter-receiver pairs which are non interfering on frequency of operation considerations.
Figure 2B:
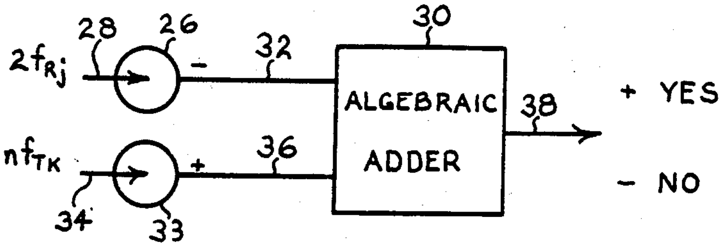
FIG. 2B is a block diagram of a second preliminary test to eliminate transmitter-receiver pairs which are non interfering.

For each transmitter-receiver pair $T_K$, $R_j$, two preliminary screening operations as shown in FIGS. 2A and 2B are performed to eliminate non interfering pairs, on the ground that their respective frequency of operation, and harmonics thereof, have insufficient coincidence. In FIG. 2A, a computer element 10 is adjusted by its input 12 to apply a positive signal $f_{TK}$ to one input of an algebraic adder 14 by a lead 16. Another computer element 18 is adjusted at its input 20 to apply a negative signal $10f_{Rj}$ to another input of the algebraic adder 14 by a lead 22.

Algebraic adder 14 determines:

$$\text{Is } f_{TK}>10f_{Rj}? \qquad (1)$$

If "yes," as indicated by a positive signal upon output 24 of algebraic adder 14, such transmitter-receiver pair is eliminated from all further testing and designated as a non-interfering pair. If "no," as indicated by a negative signal upon the output 24, the second preliminary screening operation is performed according to FIG. 2B. In FIG. 2B, a computer element 26 is adjusted by its input 28 to apply a negative signal $2f_{Rj}$ to one input of an algebraic adder 30 by a lead 32. Another computer element 33 is adjusted at its input 34 to apply, in succession, positive signals $nf_{TK}$ to another input of 30 by a lead 36, $n$ taking the values 1 to 8 harmonics above the 8th can be ignored.

Algebraic adder 30 determines:

$$\text{Is } nf_{TK}-2f_{Rj}>0? \qquad (2)$$

when $n=1, 2, 3 \ldots 8$.

Figure 3:
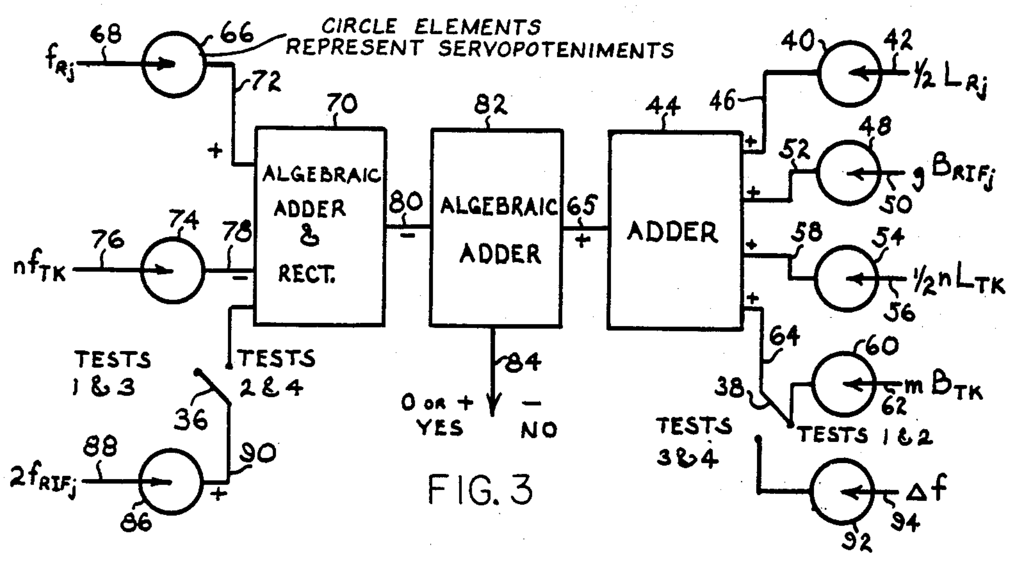
FIG. 3 is a block diagram of four screening tests to eliminate transmitter-receiver pairs as non interfering by comparing the transmitter fundamental and harmonic emissions and their spurious transmissions with the receiver fundamental and harmonic responses as well as the receiver image and spurious sensitives.

If "yes," as indicated by a positive signal upon output 38 of algebraic adder 30, such transmitter-receiver pair is eliminated from all further testing and designated as a non-interfering pair. If "no," as indicated by a negative signal upon the output 38, such transmitter-receiver pair may be an interfering pair and the four tests performed in FIG. 3 further investigates this possibility. Selector switches 36 and 38 in FIG. 3 are positioned according to which of the four Tests 1, 2, 3 or 4 is being performed.

Test 1 performs a comparison of the transmitter fundamental and harmonics thereof with the receiver operational and spurious sensitivities. In FIG. 3, a computer component 40 is adjusted at its input side 42 to apply a positive signal $\frac{1}{2}L_{Rj}$ to one input of an adder 44 by a lead 46. Another computer element 48 is adjusted at its input side 50 to apply a positive signal $gB_{RIF}$ to another input of the adder 44 by a lead 52. It has been found in practice that interference determinations can be made with a factor of safety (showing interference in excess of the actual interference) when $g=25$ for $n=1$, 2 and 3 and $g=5$ for $n=4$, 5, 6, 7 and 8. Another computer element 54 is adjusted at its input side 56 to apply a positive signal $\frac{1}{2}nL_{TK}$ to another input of the adder 44 by a lead 58. Another computer element 60 is adjusted at its input side 62 to apply a positive signal $mB_{TK}$ thereto. Selector 38 is positioned to "Test 1" and another input of the adder 44 is connected to the output of 60 by a lead 64. Adder 44 yields an output signal on lead 65 equal to the sum of the signals on leads 46, 52, 58 and 64. When transmission is AM (amplitude modulated) or PM (pulse modulated), it has been found in practice that $m$ can be ½ and $n$ can be limited to 1, 2 and 3. That is to say $m$ may be zero for $n$ equal to 4, 5, 6, 7 and 8. When the transmission is FM (frequency modulated), $m$ can be $\frac{1}{2}\times n$ and $n$ can be limited to 1, 2 and 3.

Another computer element 66 is adjusted at its input side 68 to apply a positive signal $f_{Rj}$ to an input of an adder 70 by a lead 72. Another computer element 74 is adjusted at its input side 76 to apply a negative signal to another input of the adder 70 by a lead 78. A third input to adder 70 is deactivated by positioning selector switch 36 to "Test 1." Adder 70 is basically an algebraic adder of the signals on leads 72 and 78. However, it has a rectifier stage which assures that the output algebraic sum is always a negative signal on lead 80. Alternatively, other circuitry can selectively convert all positive output algebraic sum signals into equivalent negative signals.

An algebraic adder 82 receives as inputs the positive signal on lead 65 and the negative signal on lead 80 to provide an output on lead 84.

FIG. 3 applies test:

$$\text{Is } [|f_{Rj}-nf_{TK}|]\leq[\tfrac{1}{2}L_{Rj}+gB_{RIFj}+\tfrac{1}{2}nL_{TK}+mB_{TK}] \qquad (3)$$

A zero or positive signal on lead 84 indicates a "yes" while a negative signal indicates a "no."

Test 2 is a comparison of the transmitter fundamental and harmonics thereof with the receiver image sensitivity. Test 2 is perfomed with the apparatus of FIG. 3 when the selector switches 36 and 38 are positioned to "Test 2." The new position of selector switch 36 connects another input of the adder 70 to another computer element 86 which is adjusted at its input side 88 to apply a positive signal $2f_{RIFj}$ to adder 70 by a lead 90 connected therebetween.

Test 2 probes:

$$[|f_{Rj}+2f_{RIFj}-nf_{TK}|]\leq\tfrac{1}{2}L_{Rj}+gB_{RIFj}+\tfrac{1}{2}nL_{TK}+mB_{TK}] \qquad (4)$$

As in Test 1, a zero or positive signal on lead 84 indicates a "yes" for Test 2 while a negative signal indicate a "no."

Test 3 is a comparison of the transmitter spurious emissions with the receiver operational sensitivity. Test 3 is performed with the apparatus of FIG. 3 when the selector switches 36 and 38 are positioned to "Test 3." Selector switch 36 deactivates component 86 and selector switch 38 removes the components 60 from the fourth input to 44 and connects the latter to a computer component 92. Component 92 is adjusted at is input side 94 to yield a quantity $\Delta f$ which is defined as an incremental value (not a solution) equal to $f_{TK}-f_I'$. The quantity $f_I'$ is determined by:

For AM:

$$\frac{0.8P'_{TK}f^3_{TmK}}{[|f_{TK}-f_I'|]^4}=0.001$$

For FM:

$$\frac{12.5P'_{TK}f^3_{TmK}}{[|f_{TK}-f_I'|]^4}=0.001$$

For PM:

$$\frac{0.823P'_{TK}}{H^4[|f_{TK}-f_I'|]^4}=0.001$$

From practical considerations $m$ and $g$ can each be limited to one value in Test 3, namely $m=1$ and $g=5$.

Test 3, by a signal on lead 84, probes:

$$[|f_{Rj}-f_{TK}|]\leqslant[\tfrac{1}{2}L_{Rj}+5B_{RIFj}+\tfrac{1}{2}L_{TK}+\Delta f] \quad (5)$$

Test 4 is a comparison of transmitter spurious emissions with receiver image sensitivity and is performed when the selector switches 36 and 38 in FIG. 3 are positioned to "Test 4." The same quantities $\Delta f$, $f_I'$, $n=1$ and $g=5$ are employed as in Test 3.

Test 4 by a signal on 84, probes:

$$[|f_{Rj}+2f_{RIFj}-nf_{TK}|] \leqslant[\tfrac{1}{2}L_{Rj}+5B_{RIFj}+\tfrac{1}{2}L_{TK}+\Delta f] \quad (6)$$

If "no" is indicated for Tests 1, 2, 3 and 4 by a positive signal on lead 84 in FIG. 3, the transmitter-receiver pair being tested can be considered to be non-interfering. If "yes" as indicated by a negative or zero signal on lead 84, then such transmitter-receiver pair is possibly subject to interference and a frequency of interest $f_I$ must be designated for further testing.

The $f_I$ is determined from the following:

If $L_{TK}=L_{Rj}=0$, and if Test 1 yields "yes," then $f_I=f_{Rj}$
If $L_{TK}=L_{Rj}=0$, and if Test 2 yields "yes," then $f_I=f_{Rj}+2f_{RIFj}$
If $L_{TK}=0$, $L_{Rj}\neq0$, then $f_I=nf_{TK}$
If $L_{TK}\neq0$, $L_{Rj}=0$, and if Test 1 yields "yes," then $f_I=f_{Rj}$
If $L_{TK}\neq0$, $L_{Rj}=0$, and if Test 2 yields "yes," then $f_I=f_{Rj}+2f_{RIFj}$
If $L_{TK}\neq0$, $L_{Rj}\neq0$, and if Test 1 or Test 3 yields "yes" is $nf_{TK}>f_{Rj}$? If "yes," $f_I=f_{Rj}+\tfrac{1}{2}L_{Rj}+5B_{RIFj}$
If "no," $f_I=f_{Rj}-\tfrac{1}{2}L_{Rj}-5B_{RIFj}$
If $L_{TK}\neq0$, $L_{Rj}\neq0$, and if Test 2 or Test 4 yield "yes," then use $f_{Rj}+2f_{RIFj}$ in place of $f_{Rj}$ in expressions immediately preceding.

Referring to FIG. 1, all of the transmitter-receiver pairs, $T_1R_1$, $T_1R_2$ . . . $T_KR_j$, which are not eliminated by the two preliminary tests shown in FIGS. 2A and 2B are subjected to Tests 1, 2, 3, and 4. If any of Tests 1, 2, 3 or 4 yields "yes" for such transmitter-receiver pair store $n$, $f_{TK}$, $f_{Rj}$, $f_I$, the test number yielding a "yes" as well as the service numbers associated with the respective transmitters and receivers. By assigning the same identification number to the transmitter and receiver of a radar set as well as to the transmitters and receivers operating on a single frequency (e.g. vehicle-mounted transceivers), the transmitter-receiver pairs with the same identification numbers can be quickly eliminated without performing the tests according to FIGS. 2 and 3. If a group of sets are alike and operate in a net on one frequency, one entry will suffice to represent all of them. This, of course, assumes that good net discipline is maintained.

Figure 4:
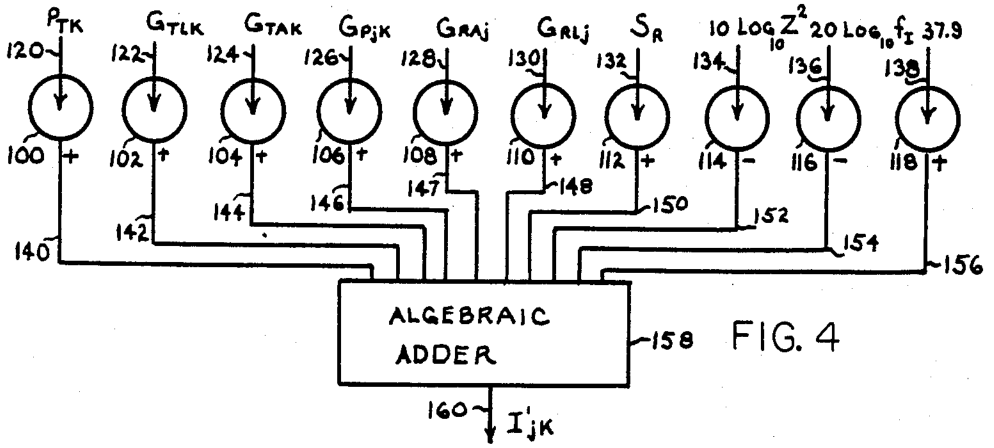
FIG. 4 is a block diagram of circuit means to determine the "worst case" interference power of transmitter-receiver pairs which survive the screening of FIGS. 2A, 2B and 3.

A second computer run, as illustrated in FIG. 4 begins with a selection, on the basis of a calculation of "worst-case" interference, which reduces again the number of possible interference pairs requiring further consideration.

The selection test compares a calculated value of the power from the interfering transmitter I at the receiver with the receiver's minimum discernible signal. Separate calculations of both, and the comparison, make up the second computer run. In this second computer run, it is assumed that all antennas are nondirectional. Antenna gain is taken equal to the gain in the main beam for directional antennas.

The minimum discernible signal for each transmitter-receiver pair not eliminated by FIGS. 2A, 2B, and 3 is determined in FIG. 4 according to the formula:

$$I'_{JK}=P_{TK}+G_{TLK}+G_{TAK}+G_{PJK}+G_{RAj}+G_{RLj}+S_R-10\log_{10}Z^2-20\log_{10}f_I+37.9 \quad (7)$$

where:

$P_{TK}$: Output power of transmitter, nominal, in dbm.
$P'_{TK}$: Output power of transmitter, nominal, in watts.
$P_{TnK}$: Output power of transmitter at harmonic frequencies, $n=1, 2$ . . . 8.
$P_{TS}$: Power output of spurious emissions.
$G_{TLK}$: Gain, transmission line, transmitter, db.
$G_{TAK}$: Gain, antenna, transmitter, db.
$G_{PJK}$: Gain effect due to relative polarization of transmitter and receiver antennas, db.
$G_{RAj}$: Gain, antenna, receiver db.
$G_{RLj}$: Gain transmission line, receiver db.
$L_I$: Wavelength at $f_I$: meters.
Z: Distance between antennas, feet.
I': Calculated "worst case" interference power, $I'_{JK}$ refers to a transmitter-receiver pair being investigated.
$F_j$: Noise figure, $j$th receiver.
$V_K$: Modulation index, $k$th transmitter.
$M_D$: Minimum discernible signal.
$S_R$: Receiver sensitivity factor.

FIG. 4 illustrates the testing of each transmitter-receiver pair which has not been eliminated by FIGS. 2A, 2B and 3. In FIG. 4, there is shown a plurality of computer components 100, 102, 104, 106, 108, 110, 112, 114, 116 and 118 each of which is adjusted at its input side 120, 122, 124, 126, 128, 130, 132, 134, 136 and 138 to yield $P_{TK}$, $G_{TLK}$, $G_{PJK}$, $G_{RAj}$, $G_{LRj}$, $S_R$, 10 $\log_{10} Z^2$, 20 $\log_{10} R^2$, 20 $\log_{10} f_I$ and the quantity 37.9 on leads 140, 142, 144, 146, 148, 150, 152, 154 and 156 respectively. All of the output signals, execept those from 114 and 116, are adjusted to be positive, the signals from 114 and 116 being negative. The leads 140—156 are connected to individual inputs of an algebraic adder 158. The output on lead 160 from adder 158 is $I'_{JK}$.

The quantities for the inputs to components 100—118 will now be discussed. Interference is caused by fundamental or harmonic of a transmitter being near $f_I$. Accordingly, $P_{TK}$ is a function of $f_I$. Hence, the output of the transmitter near $f_I$ at fundamental frequency $P_{TK}$ or at a harmonic frequency $P_{TnK}$ or at a spurious frequency is significant. Which is appropriate will be shown by the value for $n$ or by the indication that Test 3 or Test 4 (both FIG. 3) produced a "yes," each of such tests indicating possible interference due to spurious emission.

For $n=1, 2, 3, 4, 5, 6, 7, 8$ $$P_{TnK}=10\log_{10}P'_{TnK}+30 \quad (8)$$

$P_{TnK}$ is a set of entered values for $P_{TnK}$. If the fundamental frequency power is unknown, a representative value is entered. If the harmonic frequency power is unknown, the quantity "?" is entered since "0" entries are used by the program to signify literally zero power at the indicated frequency. The entry "?" will call up a sub-routing;

For any $n$ of 2, 3, 4, 5, 6, 7, 8

$$P_{TnK}=P_{T1K}-20-6n \quad (9)$$

Spurious power is calculated, preferably by a computer, from one of the following three equations according to the type of modulation employed.

If AM:

$$P'_{TSK}=\frac{0.8P'_{T1K}f^3_{Tm}}{[|f_{TK}-f_I|]^4}$$

If FM:

$$P'_{TSK}=\frac{12.5P_{T1K}f^3_{TMK}}{[|f_{TK}-f_I|]^4}$$

If PM:

$$P'_{TSK}\frac{0.823P_{T1K}}{H^3[|f_{TK}-f_I|]^4}$$

and, in all these cases, for finding I', $$P_{TK}=10\log_{10}P_{TSK}+30 \quad (10)$$

The gain of the transmitter transmission line $G_{TLK}$ may also be a function of $f_I$.

The following data is entered:

If $0<f_I\leqslant f_{TL1K}$, then enter $G_{TLK}=G_{TL1K}$
If $f_{TL1K}<f_I\leqslant f_{TL2K}$, then enter $G_{TLK}=G_{TL2K}$
If $f_{TL2K}<f_I\leqslant f_{TL3K}$, then enter $G_{TLK}=G_{TL3K}$ The effects of filters as well as of the transmission line itself may be provided for in this form. A single corner frequency will probably be sufficient for most situations.

If the user has no data he enters 0 db.

$G_{TAK}$ may be treated like $G_{TLK}$. If no data are available, user may enter:

$f_{TA1K}=3f_{TK}$
If $0<f_I\leqslant f_{TA1K}$, then $G_{TAK}=G_{TA1K}=G_{TAK}$
If $f_{TA1K}<f_I$, then $G_{TAK}=G_{TA2K}=0$ db
$G_{Pjk}$ is obtained from the following table.

*Table I*

| | Receiver polarization | | | | |
|---|---|---|---|---|---|
| | Horiz. | Vert. | Diag. | Circular CW | Circular CCW |
| Transmitter: | | | | | |
| Horizontal polarization | 0 | −20 | −3 | −3 | −3 |
| Vertical polarization | −20 | 0 | −3 | −3 | −3 |
| Diagonal polarization | −3 | −3 | 0 | −3 | −3 |
| Circular—CW polarization | −3 | −3 | −3 | 0 | −25 |
| Circular—CCW polarization | −3 | −3 | −3 | −25 | 0 |

$G_{RAj}$ is treated like $G_{TAK}$.
$G_{RLj}$ is treated like $G_{TLK}$.

For determining $S_R$ (the receiver sensitivity factor), it has been observed in practice that for frequencies more than $8B_R$ removed from $f_R$, a receiver has at least 80 db less sensitivity than at frequencies nearer $f_R$. Accordingly, $$\text{Is } |f_I-f_R|>8B_R\ ? \qquad (11)$$

If "Yes," enter $S_R=-80$ db and if "no," enter $S_R=0$ db.

The distance Z between antennas (see FIG. 1) is determined by:

$$Z^2=(X_T-X_R)^2+(Y_T-Y_R)^2 \qquad (12)$$

when it is assumed that the earth is flat over the range of interest.

The above considerations and terms provide the inputs to components 100—116 of FIG. 4 yielding $I'_{JK}$ on lead 160. However, I' is constrained to be always less than or equal to $P_{TK}$.

Figure 5:
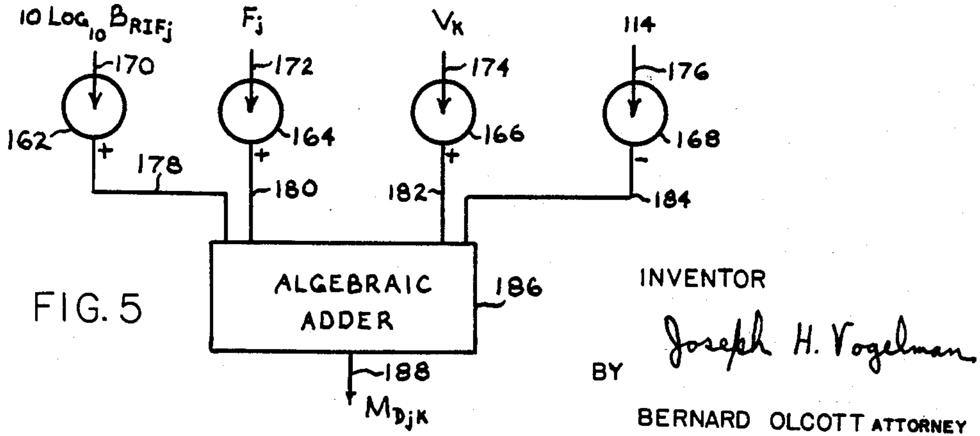
FIG. 5 is a block diagram of circuit means to determine the minimum discernible signal for the receiver of each transmitter-receiver pair which survives the screening of FIGS. 2A, 2B and 3.

Each transmitter pair subjected to FIG. 4 is also subjected to FIG. 5 for determining the minimum discernible signal $M_D$. In FIG. 5, there is shown a plurality of computer components, 162, 164, 166 and 168 each of which is adjusted at its input side 170, 172, 174 and 176 to yield 10 $\log_{10} B_{RIFj}$, $F_j$, $V_K$ and the quantity 114 on leads 178, 180, 182 and 184, respectively. The output signals on leads 178, 180 and 182 are adjusted to be positive while the output on lead 184 is negative. The leads 178—184 are connected to individual inputs of an algebraic adder 186 to yield an output from the latter on lead 188 as $M_{Dj}K$.

Algebraic adder 186 provides:

$$M_{Dj}K=-114+10\log_{10}B_{RIFj}+F_jV_K \qquad (13)$$

All of the quantities for the inputs to 162, 164, 166 and 168 are usually known. If unknown, representative values are entered. For the modulation index, $k$th transmitter, $V_K$, 0 or 5 db is entered, the former for AM and PM, the latter for FM.

When $I'_{JK}$ from FIG. 4 and $M_{DJK}$ from FIG. 5 are determined for each transmitter-receiver pair which were not eliminated in FIGS. 2A, 2B and 3, the following test is applied, preferably by a computer:

$$\text{Is } I'\leqslant M_D+D? \qquad (14)$$

where D is a predetermined margin for a desired level of protection.

If "yes," such pair is a possible interference pair, store $j$, K, I', $M_D$, $(I'-M_D)$. If "no," store $j$, K, I', $M_D$, $Z^2$ for later processing.

Those transmitter-receiver pairs which are not eliminated by Equation 13 are now subjected to interference calculation and classification in terms of the relation between I, the interference power at the receiver, and four classes, or conditions, of predicted interference, namely: "unlikely," "nuisance," "likely," and "highly probable," wtih respect to the receiver's minimum discernible signal, $M_D$ (FIG. 5) and a user-fixed minimum expected or acceptable signal, $M_x$. The interference power I is calculated from I' (FIG. 4) and from information about the antenna patterns and rotations. The proportions of time that a given receiver will have interference of each classification will be considered in the calculations.

The following symbolism will be employed:

$G$, $G_{TA}$, $G_{RA}$: Gain of antenna; main beam gain if directional; db.

$d_T$, $d_R$: Half-beamwidth of antenna main beam-degrees.

(X, Y, $h$): Position coordinates of antenna, feet. Subscripts M and F designate rotating and non-rotating antennas, respectively.

$\phi_F$: Angle of pointing of axis of main beam, for a non-rotating directional antenna, clockwise from grid north; degrees.

$M_x$: Minimum expected or acceptable desired signal at receiver; dbm.

$\theta$: Angle, measured from center line of main beam of directional antenna; degrees.

E: Angle, measured in vertical plane, from horizontal to line of sight joining two antennas.

$r$, S: Integers from the set 1, 2, . . . 5, used to denote antenna patterns of a receiving or transmitting antenna respectively.

$\Delta G_r$, $\Delta G_S$: Modifications reflecting the reduction of gain in the antenna pattern at various azimuths; for receiving and transmitting antennas respectively.

$C_n(I_{rs})$: A counting variable, dependent on the value of $I_{rs}$, introduced for convenience.

$Q_n$: Proportion of total time for which a predicted interference level is expected. $n=1, 2, 3, 4$, corresponding to the four prediction classes.

$q_r$, $q_S$: Fractions of the circle occupied by antenna sections $r$ and S.

The central quantity in the calculations of this section is I. This is the power at the receiver due to the interfering transmitter. Its magnitude depends on which sector of each antenna pattern falls on the line of sight joining the antennas. I takes on different values with time, denoted $I_{rs}$, as the antennas rotate. (If both antennas are fixed, $I_{rs}$ has only one value.) When $I_{rs}$ is known, it is compared with the thresholds defining the four classes of interference. We can then accumulate the proportions of time during which the rotations of the antennas cause interference of the various classes.

To do this, the following is needed: a way to describe the variation of gain with azimuth for an antenna; a way to calculate the various values of $I_{rs}$; a definition in quantitative terms of the interference classifications; a way to describe the proportion of time each antenna sector is active; and an expression combining $I_{rs}$ and the sector times so that we can accumulate the proportions of time each interference class is present. It is also necessary to show how the various combinations of rotating and fixed antennas are provided for by the formulation.

Furthermore, the possibility that a significant difference in heights of antennas exists should be taken in account. Calculations should include a test to see if a significant difference exists. If so, the same process can be used, if not, some minor modifications are made.

Each of the items just mentioned will now be considered.

As to antenna gain, it is assumed that antennas may be adequately described either as: non-directional (gain the same in all directions); or directional and having a single pattern such as "pencil" beam, "search," and "beavertail" height-finder radars; or special which should be differently treated.

The pattern is assumed to be a right circular solid of revolution about the axis of the main beam. As considered in plan or elevation, there are usually three sidelobes on each side of the main beam; a "back" region fills in the rest of the circle. The following table shows by way of an example only the gain in the various sectors in db relative to the gain $G(G_{TA}$ or $G_{RA})$ of the main beam:

*Table II*

| Sector | Angular Limits Measured From Centerline of Main Beam | Relative gain db |
|---|---|---|
| 1. Main Beam | $-d$ to $+d$ | 0 |
| 2. First Sidelobe | $+d$ to $+3d$<br>$-d$ to $-3d$ | −23 |
| 3. Second Sidelobe | $3d$ to $5d$<br>$-3d$ to $-5d$ | −27 |
| 4. Third Sidelobe | $5d$ to $7d$<br>$-5d$ to $-7d$ | −30 |
| 5. Back | $7d$ to $360-7d$ | $-G-3$ |

By definition, $d$ is the "half beamwidth" of the main beam and G is $G_{TA}$ for transmitters and $G_{RA}$ for receivers.

If both antennas are directional, and if either or both rotate, sooner or later all possible combinations of the sectors of one antenna with those of the other will fall simultaneously along the line of sight joining the two. (In theory, if certain speed ratios are maintained exactly constant, the time required to develop all combinations approaches infinity.)

At any instant, then, one of the boxes of Table II will describe the gain of one antenna of the pair which is effective at the moment. A box of the table also describes the gain for the other antenna. (The two box entries may each refer to a different main beam gain, of course.)

I', as found in FIG. 4 is in effect the interference power for main beam-to-main beam conditions. The interference power $I_{rs}$ for any pair of antenna sector combinations falling on the line of sight joining the antennas is found from:

$$I'_{rs}=I'+\Delta G_r+\Delta G_s \tag{15}$$

The term $r$ designates the active sector of the receiving antenna, and $s$ that of the transmitting antenna. Quantities $r$ and $s$ always have one of the integral values 1, 2, . . . 5; these correspond to the five rows of the above gain Table II. Quantities $r$ and $s$ can be found when needed by comparing $\theta$ to $d$, i.e., $\theta_r$ to $d_r$ and $\theta_s$ to $d_s$, and using the following table:

*Table III*

| | |
|---|---|
| $\theta \leqslant d$: $r$ (or $s$) | =1 |
| $d<\theta \leqslant 3d$: $r$ (or $s$) | =2 |
| $3d<\theta \leqslant 5d$: $r$ (or $s$) | =3 |
| $5d<\theta \leqslant 7d$: $r$ (or $s$) | =4 |
| $7d<\theta$: $r$ (or $s$) | =5 |

$\theta$ is the angle from the main beam of the antenna to the line of sight joining the antennas, measured in whichever direction, CW (clockwise) or CCW, (counterclockwise) yields a smaller value. $r$ or $s$ locates the line of sight in one of the antenna sectors.

If both antennas rotate it is unnecessary to calculate $r$ and $s$; instead all possible combinations are used. For a fixed antenna, however, $\theta$ must be found from the grid coordinates of the antennas and from $\phi$, the direction of pointing of the main beam as explained later.

Given $r$ (or $s$), $\Delta G_r$ (or $\Delta G_s$) is obtained from the table:

*Table IV*

| $r$ (or $s$) | $G_r$ (or $\Delta G_s$) |
|---|---|
| 1 | 0 |
| 2 | −23 |
| 3 | −27 |
| 4 | −30 |
| 5 | $-G-3$ |

This of course is the same relationship given in Table II. Again "G" is $G_{TA}$ for transmitters, $G_{RA}$ for receivers.

The value of $|\Delta G|$ should not exceed G for $r$ or $s$ =1, 2, 3, or 4. Thus before using the value of $\Delta G$ from the table, it should be tested to determine whether $G-|\Delta G|>0$; if yes, then $\Delta G=-G$ is used.

A non-directional antenna is one for which $\Delta G$ is zero.

Mathematical formula for the four classes of interference prediction, and the defined bounds thereof, will now be determined. To simplify calculations in the next step, we define a special "counting"-type variable $C_n(I_{rs})$, also as shown in the table below.

$C_n(I_{rs})$ is a variable which can have only one or the other of two values: 0 and 1. $I_{rs}$ determines which corresponds to a given situation. Four such variables are provided, corresponding to the four interference prediction classes.

*Table V*

| If | $I_{rs} \leq M_D$ | $M_D < I_{rs} \leq M_x$ | $M_x < I_{rs} \leq M_x+10$ | $M_x+10 < I_{rs}$ |
|---|---|---|---|---|
| Then interference is | "unlikely" | "nuisance" | "likely" | "highly probable" |
| and $C_1(I_{rs})$= | 1 | 0 | 0 | 0 |
| $C_2(I_{rs})$= | 0 | 1 | 0 | 0 |
| $C_3(I_{rs})$= | 0 | 0 | 1 | 0 |
| $C_4(I_{rs})$= | 0 | 0 | 0 | 1 |

$C_n(I_{rs})$ is found for directional and non-directional antennas alike.

$M_D$ is calculated in, and carried forward from, the apparatus of FIG. 5. $M_X$ is assumed to be known input information.

The proportion of time for which a given class of interference will exist is defined as $Q_n$, where $n$=1, 2, 3, 4 corresponding to the four classes and as defined for $C_n$ above. $Q_n$ will be calculated from $$Q_n=\sum_{r=1}^{5}\sum_{s=1}^{5} q_r \times q_s \times C_n(I_{rs}) \tag{16}$$

$q_r$ and $q_s$ are the proportions of a circle occupied by sectors $r$ and $s$ of the antennas. (As above, $s$=1, 2, . . . 5 for the transmitting antenna and $r$ similiarly for the receiving antenna.) The quantities $q_r$ and $q_s$ are given by

*Table VI*

| $r$ | $q_r$ | $s$ | $q_s$ |
|---|---|---|---|
| 1 | $\frac{2d_r}{360}$ | 1 | $\frac{2d_T}{360}$ |
| 2 | $\frac{4d_r}{360}$ | 2 | $\frac{4d_T}{360}$ |
| 3 | $\frac{4d_r}{360}$ | 3 | $\frac{4d_T}{360}$ |
| 4 | $\frac{4d_r}{360}$ | 4 | $\frac{4d_T}{360}$ |
| 5 | $1-\frac{14d_r}{360}$ | 5 | $1-\frac{14d_T}{360}$ |

The formula:

$$Q_n = \sum_{r=1}^{5} \sum_{s=1}^{5} q_r \times q_s \times C_n(I_{rs}) \qquad (17)$$

accumulates the proportion of time for each class, and it is to be noticed that only 25 combinations of the values of $r$ and $s$ are possible. To investigate these combinations assume a value of $r$; determine, in succession, what happens for each of the five values of $s$. Assume another $r$; determine again what happens for each of the five values of $s$; etc.

For a given $r$ and $s$, $q_n$ and $q_s$ are defined by Table VI. Also, $I_{rs}$ is defined by Equation 15; and the G terms are given by the Table IV. Now, a given value of $I_{rs}$ determines the values of all four of the counting variables $C_n(I_{rs})$; one is "1," and the others are "0" (see Table V).

It is necessary now only to accumulate, in four separate registers, the four $Q_n$s. For each $r$, $s$ combination, four $q_r \times q_s \times C_n(I_{rs})$ products are obtained and added to the previous contents of the $Q_n$ registers. Three of the four products will be 0; the fourth will increase the $Q_n$ for which the $C_n(I_{rs})$ term is "1"—i.e., the proportion of time corresponding to the interference condition present for $r$ and $s$, the active antenna sectors.

In the foregoing the cases with the most conditions have been considered, those in which both antennas rotate. If only one—or neither—rotates, $Q_n$ can be determined with fewer calculations.

If only one antenna rotates, the value of $r$ or $s$ (corresponding to which antenna is fixed) is determined by finding which antenna sector of the fixed antenna contains the line of sight to the rotating antenna.

$$\theta_F = \left[\arc \tan \frac{X_m - X_F}{Y_m - Y_F}\right] - \phi_F \qquad (18)$$

Where $X_F$, $Y_F$: Coordinates of the fixed, i.e. non-rotating antenna $X_m$, $Y_m$: Coordinates of the moving, i.e. rotating, antenna.

$\phi_F$: Angle, measured clockwise from grid north, of the direction of pointing of the axis of the main beam of the fixed antenna.

$\Theta_F$, used as $\Theta_R$ or $\Theta_r$ in the procedure associated with Table III yields the one $r$ or $s$ required.

Only five combinations—the one value of $r$ and $s$ and, in turn, the five possible values of the other—now need be considered. The equation for $Q_n$ reduces to $$Qn = \sum_{r=1}^{5} q_r \times C_n(I_{rs}) \text{ if } s \text{ is fixed} \qquad (19)$$

or $$Qn = \sum_{s=1}^{5} q_s \times C_n(I_{rs}) \text{ if } r \text{ is fixed} \qquad (20)$$

For each of the five combinations, a value of $I_{rs}$ can be obtained. Thus the values of the four $C_n(I_{rs})$ variables are determined; and an addition is made to one of the $Q_n$ registers. After all five have been examined, the quantities $Q_n$ are known.

If the fixed antenna is non-directional, no $\Theta_F$, $r$, or $s$ need be calculated; its $\Delta G$ will be zero. The values of $I_{rs}$ found will reflect the conditions imposed by the rotating directional antenna; so all is accounted for. If both antennas are fixed, only one value of $r$ and one of $s$ is relevant. In this case $$Q_n = C_n(I_{rs}) \qquad (21)$$

which means that only one condition can occur—e.g. if $Q_1 = 1$, $Q_2$, $Q_3$, $Q_4$ are all zero.

The values of $r$ and $s$ are found by first finding $\Theta_T$ and $\Theta_R$, using the foregoing equation for $\Theta_F$. Then $r$ and $s$ are obtained, as above, using Table III.

Only one $I_{rs}$ is relevant; it is found, using $r$ and $s$, and it determines which $Q_n$ is 1 and which are 0 by fixing the values of the $C_n(I_{rs})$.

If one antenna (or both) is non-directional, no calculation of $r$ or $s$ is required for it.

To test for the significance of the difference in antenna heights, the angle E is calculated. This is the angle between a horizontal line and the line of sight joining the antennas; it is defined as follows:

$$E \triangleq \frac{|H_T - H_R|}{\sqrt{Z^2}}$$

$H_T$ and $H_R$ are known input data; Z is the distance between antennas.

If $E \leqslant d$ for an antenna, the "horizontal" plane conditions and procedures described above are valid.

If $E > d$, changes are made as follows:

If both antennas are non-rotating, compare $\Theta$ and E for one antenna. Use the larger to find $r$, (or $s$) as in Table III. Then obtain $\Delta G$ as before. Repeat the process for the other antenna. This permits $I_{rs}$ to be found; the rest of the process of finding $Q_n$ can be carried out as above. If one antenna is non-directional, no calculation for $r$ or $s$ is required. Its $\Delta G$ is zero. If one antenna is fixed and one is rotating, the fixed antenna is treated as described in connection with Equation 22 and Table III. If the rotating antenna has $E > d$, its $r$ (or $s$) cannot be 1. Accordingly, $r$ or $s$ is restricted to the subset 2, 3, 4, 5. $I_{rs}$ is found, for the pair, as described above; but only four values, corresponding to the limited $r$ or $s$, will occur.

$C_n(I_{rs})$ is found as above.

A new table is required for $q$. This new table is identical with that of the table herein described.

$$\text{For } r=1,\ q=0;\ \text{for } s=1,\ q=0$$

$$\text{For } r=2,\ q=\frac{6d_R}{360};\ \text{for } s=2,\ q=\frac{6d_S}{360}$$

Otherwise $Q_n$ is found as above.

If both antennas are rotating, each must be treated as described hereinabove for a rotating antenna. Both $r$ and $s$ are limited to the subset 2, 3, 4, 5. Only sixteen values of $I_{rs}$ will be found. Both $q_r$ and $q_s$ is found as above.

It remains perhaps to be pointed out that the above treatment of the $E > d$ cases is conservative. Interference may be expected to be less than that predicted in some cases. There are two reasons.

First, the geometry is such that the actual time the first side lobe is on the line of sight will be less than indicated by the tables for $q$.

Second, in some cases the line of sight may actually fall outside the first side lobe at all times (if $E > 3d$, for example).

For each interference pair the test for significant height difference is applied. $Q_n$ is then calculated as outlined above herein. Distinctions are drawn, as indicated, on the basis of whether antennas are non-directional or directional, and, if the latter whether fixed or rotating. The input data is:

$d_{TK}$, $d_{Rj}$: Half beamwidths, degrees.

$H_T$, $H_R$: Antenna heights, feet.

$\phi_{TK}$, $\phi_{Rj}$: Azimuth of pointing of a fixed directional antenna; degrees. User enters "$x$" for a non-directional antenna, "$z$" for a rotating antenna. A "0" entry indicates a fixed antenna pointing to grid north.

$M_x$: Minimum acceptable or expected signal, in dbm.

User enters representative values if known data are unavailable.

The interference predictions hereinbefore may now qualify to reflect the effects of; scheduled times of operation; and of relative antenna rotation rates.

Clearly, if the transmitter and receiver of an interference pair are scheduled to operate only during non-coinciding time intervals, no interference will occur. If intervals of operation overlap somewhat, a statement of when and for how long will be a useful part of the prediction.

Although this time scheduling effect may show an interference pair to be non-interfering, performing the calculation in this part of the process, rather than earlier where it might reduce the number of interference pairs, has an advantage. A change of schedule, which might be made without consideration of interference effects, could make the pair significant. The arrangement presented here results in an output which marks the pair as currently non-interfering and at the same time shows what the interference effect might be if the schedule was changed.

The second set of effects examined now may be quite involved. Consider a situation as described by the results of the preceding section: interference is "likely" one-tenth of the time, "unlikely" the rest of the time. But the one-tenth might represent one hour out of ten or six seconds out of every minute. The significances to the user might be altogether different.

To formulate a description of these situations in terms both meaningful and practical (with regard to the cost and significance of the results) is not simple. The formulations presented here are useful; but they have a limited application. Every possible situation is not provided for. But with an appreciation of the limitations the user will find them worthwhile.

The following symbols will be used:

$t_{1,m}$: Time number 1 goes "on"—$m$=odd integers.
Time number 1 goes "off"—$m$=even integers.
$t_{2,m}$: Time, similarly, for number 2.
T: Duration of period of concern. 24 hours or less. Times are expressed in 24-hour clock time: 0001 to 2359. The user expresses times with respect to a common reference time. 1 and 2 designate the members of an interference pair, assigned arbitrarily for scheduling calculations. But for rotating antenna cases, 2 is associated with the faster rotating antenna.

Rotating antennas:

$Q_n'$: Proportion of time, Q, as determined hereinbefore, expressed in terms of antenna rotation rates.
$W_1$, $W_2$: Speed of rotation of antennas, r.p.m. $W_2' \geqslant W_1$.
$t$, $t_1$, $t_2$: Rotation period, equal to $1/W_1$, $1/W_2$ minutes.

Schedule effects are examined for each interference pair by the following process.

Take $t_{2,1}-t_{1,1}$
If this is $>0$, $t_{1,1}$ is the smaller. Then,
Take $[t_{2,1}-t_{1,2}]$
If this is $<0$, interference starts at $t=t_{2,1}$
If this is $\geqslant 0$, go to next sequence: $m=3$ and 4, $n=1$ and 2
If $[t_{2,1}-t_{1,1}]<0$, $t_{2,1}$ is the smaller. Then,
Take $t_{1,1}-t_{2,2}$
If this is $<0$, interference starts at $t=t_1$.
If this is $\geqslant 0$, go to next sequence: $n=3$ and 4, $n=1$ and 2.

If $[t_{2,1}-t_{1,1}]=0$, interference starts at $t=t_{2,1}=t_{1,1}$. Now, if the first sequence did not produce an "interference starts" time, the sequence is repeated using $m$ (or $n$)=3 and 4 instead of 1 and 2, as indicated above. It may be necessary to re-cycle in this way several times.

If an "interference starts" time was found, the next step is to find the end of the interference interval. Thus, Take $[t_{2,2}-t_{1,2}]$
If this is $<0$, interference stops at $t=t_{2,2}$
If this is $>0$, interference stops at $t=t_{1,2}$
If this is $=0$, interference stops at $t=t_{1,2}=t_{2,2}$ If the interference began at $t_{1,m}$ or $t_{2,n}$ for $m$ or $n$ other than 1, the actual starting value+1 is used in place of the second subscript—"2"—shown here.

Thus interference starts with the first combination of $m$ and $n$ found, by entering successively larger values, to satisfy the conditions:

$[t_{2,n}-t_{1,m}]>0$ and $t_{2,n}-t_{1,(m+1)}<0$; or
$[t_{2,n}-t_{1,m}]<0$ and $t_{1,m}-t_{2,(n+1)}<0$; or
$[t_{2,n}-t_{1,m}]=0$.

The starting times, respectively, would be: $t=t_{2,n}$; $t=t_{1,m}$; or $t=t_{2,n}=t_{1,m}$.

The interference period would end according to whether $[t_{2,(n+1)}-t_{1,(m+1)}]<0$—end at $t=t_{2,(n+1)}$; or
$[t_{2,(n+1)}-t_{1,(m+1)}]>0$—end at $t=t_{1,(m+1)}$; or
$[t_{2,(n+1)}-t_{1,(m+1)}]=0$—end at $t=t_{2,(n+1)}=t_{1,(m+1)}$ Finding the next time merely requires continuing the process to higher values of $m$ and $n$.

The process is terminated at $t=T$, the time specified by the user as the end of the period of interest.

For those cases where one antenna rotates and one is fixed, a simple modification is made to the results of the hereinbefore calculations. The latter show the proportion of time during which each interference class exists. These proportions are now multiplied by the rotation period of the rotating antenna; the results are then expressed as:

$Q_1'$: $[Q_1\times(t=1/W)]$ Minutes out of $t=1/W$ minutes
$Q_2'$: $[Q_2\times(t=1/W)]$ Minutes out of $t$ minutes
$Q_3'$: $[Q_3\times t]$ Minutes out of $t$ minutes
$Q_4'$: $[Q_4\times t]$ Minutes out of $t$ minutes the sum of $Q_n'$, $n=1, 2, 3, 4$, is $t$; the sum of $Q_n$ is 1.

Now we consider the case of two rotating antennas. The formulation begins with a test which determines whether or not the conditions exist for which the formulation is valid.

$$\text{Is } [t_1-t_2]\leqslant(q\times t) \text{ minimum?}$$

$W_1$ and $W_2$, are assigned to the antennas so that $W_2>W_1$. Then $t_1>t_2$. $(q\times t)$ is the duration of the time increment during which the main beam of the antenna in question covers the line of sight joining the antennas. $q$ is $q_r$ or $q_s$ as determined by $r$ or $s=1$, Eq. 16.

If the difference in rotation periods is less than the smaller time increment, a condition existing at one instant will occur again (approximately), one rotation interval later. Thus if the main beams of the two antennas both include the line of sight at one instant then approximately one rotation period later they will again simultaneously include the line of sight.

The test above shows whether or not this condition can occur. It corresponds to the case of antenna speeds nearly equal, speaking roughly.

If this condition exists, interference as predicted hereinbefore will occur regularly. The period of occurence is $$\frac{1}{W_2-W_1}$$

The approximate time of duration of the predicted interference is $$\frac{(q_1+q_2)}{(W_2-W_1)}$$

Note that, during this time, interference occurs every revolution of the antennas; but during the revolution there is also a relatively long time of non-interference, when the sidelobes and back regions lie on the line of sight.

The approximum maximum time of duration of an instance of interference is $q_1t_1$ or $q_2t_2$ whichever is larger.

Thus the formulation shows interference occurring in bursts; a group of bursts occurs at about the antenna rotation rate; and the groups of bursts separated by longer intervals, occur with a longer period.

A good appreciation of this situation and the formulation may be obtained by marking drawings of two pulse trains. The "on" time of a pulse can represent the time the main beam is "on" the line of sight. Actually drawing several pairs of pulse trains with different relative speeds will give the operator a "feel" for the problems involved. Notice when the "duty cycle" is small; a main beam may well be "on" only 1% (a 3.6 deg. beam) of a rotation period, or less.

It is noted that if the antenna speeds, as entered by the user, happen to be the same, the formulation produces an infinite interference occurrence period and interference duration interval. This is literally correct and represents what would happen if an interference pair had equal antenna rotation rates. Of course, in practice, antenna speeds are never exactly equal and, indeed, are not even constant. But such an infinite result is meaningful to the user. It tells him that the pair can produce a steady interference condition.

The following is the program to be carried out for each interference pair:

List beginning and ending times of periods when both members are "on." List total of duration times of such periods. Print out the entered input data on time of interest.

If interference pair has no time when both members are "on," print out $Q_n$ as found hereinbefore and indicate that the schedule prevents interference.

For interference pairs with common "on" time, determine whether: (1) both antennas are fixed; (2) one is fixed and one rotates; or (3) both rotate. If test result is "Yes," carry out calculations as above. If test result is "No," print out results of Eq. 16. If (3), regardless of result, print out the result itself. Input data entered for each transmitter and each receiver includes: a schedule of operation—a list of times turned "on" and "off," in chronological order, starting with 0001 if a set is "on" at the start of the period of interest; and antenna rotation rate, the latter being 0 if stationary. T is entered once for all calculations.

In the exercise of the inventive concept all interference determinations have been made with a factor of safety. That is to say, the determinations will normally show more or greater interference than that which will be actually encountered.

It is to be understood that all computer elements and components may be either digital or analogue.

The design of all the computer elements shown in FIGS. 2*a*, 2*b*, 3, 4 and 5 are known and no invention is required to design and construct such elements or to modify computer elements which are commercially available. The following examples of the computer elements are mentioned with the understanding that the present invention is in no way limited to merely the specific components now listed.

For an analogue embodiment of the invention, elements 10, 18, 26, 33, 66, 74, 86, 40, 48, 54, 60, 92, 100, 102, 104, 106, 108, 110, 112, 114, 116, 118, 162, 164, 166 and 168 may be servopotentiometers controlled by a series of values as for instance recorded on magnetic tape. The adder elements 14, 30, 70, 82, 44, 158 and 186 may be Computing Amplifiers, GAP/R, K2 series, as manufactured by George A. Philbrick Researches, Inc., Boston, Mass., connected according to their Application Manual, GAP/5, 1956, page 10, FIGS. 1.2, 1.3 or page 11, FIG. 1.4. Alternatively, such computer adder elements may be designed and constructed according to Philbrick Researches, Boston, Mass., Description Sheet for Model K2–PJ Stabilizing Amplifiers dated November 1, 1961.

For a digital embodiment of the invention, an analogue to digital converter may be connected at the output sides of the servopotentiometers 10, 18, 26, 33, 66, 74, 86, 40, 52, 54, 60, 92, 100, 102, 104, 106, 108, 110, 112, 114, 116, 118, 162, 164, 166 and 168, such converters being constructed according to "Pulse and Digital Circuits," Millman & Taub, McGraw-Hill, 1956, pages 491–4, FIGS. 16–7. Such converters are also manufactured by Interstate Electronics Corp., Anaheim, California as Series 350. Digital adders 14, 30, 70, 82, 44, 158 and 186 may be constructed according to "Pulse and Digital Circuits," Millman & Taub, McGraw-Hill, 1956, page 421, FIGS. 13–36. Alternatively, digital adders may be constructed using S-Pac Digital Modules as manufactured by Computer Control Company, Inc., Framingham, Mass., when connected in the circuit of "Digital Computer and Control Engineering," Ledley, McGraw-Hill, 1960, page 491, FIGS. 15–8 and pages 493–5, FIG. 15–10, 11, and 13. Other suitable digital adders are shown in the latter reference on page 522, FIG. 16–3 and page 527, FIG. 15–6.

As mentioned earlier in the specification, adder 70 differs from the other adders in that it has a rectifier connected in its output stage to assure that the signal on lead 80 is always negative.

The quantities 10 $\log_{10} Z^2$ and 20 $\log_{10} f_I$ each can be readily and automatically determined for a series of random values of Z and $f_I$ by the circuit shown in "Silicon Rectifier Circuit Protects D.C. Meter up to 1000 times Rated Current," F. W. Gutzwiller, Electronic Design, February 5, 1958.

While there has been described and pointed out the fundamental novel features of the invention as applied to preferred embodiments, it will be understood that various omissions and substitutions and changes in the form and details of the devices illustrated and its operation may be made by those skilled in the art, without departing from the spirit of the invention. It is the intention, therefore, to be limited only as indicated by the scope of the following claims.

What is claimed is:

1. Method of predicting radio frequency interference in a plurality of receivers by a plurality of transmitters which comprises the steps of eliminating transmitter-receiver pairs which do not have a corresponding frequency, within a predetermined tolerance, between one harmonic of the transmitter and one harmonic of the receiver of each of said pairs and determining the severity of the interference between the transmitter-receiver pairs which are not eliminated.

2. Method according to claim 1 wherein the first harmonic frequency of each transmitter is adjustable over a range of frequencies and has associated therewith spurious frequencies, each receiver has a first harmonic frequency response characteristic which is tunable over a range of frequencies and has associated therewith an image frequency response and spurious frequency responses and said eliminating step and said determining step is performed on the transmitter-receiver pairs with respect to combinations of one frequency of the transmitter and one frequency of the receiver.

3. Method according to claim 2 wherein the second and higher order harmonic frequencies of the first harmonic frequency of the transmitter in a transmitter-receiver pair is subjected to said eliminating step and said determining step in combination with the second and higher order harmonic frequencies of the first harmonic frequency of the receiver.

4. Circuit means for predicting radio frequency interference in a plurality of receivers by a plurality of transmitters which comprises means for eliminating transmitter-receiver pairs which do not have a corresponding frequency, within a predetermined tolerance, between one harmonic of the transmitter and one harmonic of the receiver of each of said pairs and means for determining the severity of the interference between the transmitter-receiver pairs which are not eliminated.

5. Circuit means according to claim 4 wherein the first harmonic frequency of each transmitter is adjustable over a range of frequencies and has associated therewith spurious frequencies, each receiver has a first harmonic frequency response characteristic, which is tunable over a range of frequencies and has associated therewith an image frequency response and spurious frequency response and said eliminating means and said determining means is operative on the transmitter-receiver pairs with respect to combinations of one frequency of the transmitter and one frequency of the receiver.

6. Circuit means according to claim 5 wherein said eliminating means said determining means the second and higher order harmonic frequencies of the first harmonic frequency of the transmitter in a transmitter-receiver pair is considered in combination with the second and higher order harmonic frequencies of the first harmonic frequency of the receiver.

7. Method of predicting radio frequency interference in a plurality of receivers by a plurality of transmitters which comprises the steps of eliminating transmitter-receiver pairs which do not have a corresponding frequency, within a predetermined tolerance, between one harmonic of the transmitter and one harmonic of the receiver of each of said pairs and determining the severity of the interference between the surviving transmitter-receiver pairs assuming that all antennas are non-directional with gain equal to main beam gain.

8. Method of predicting radio frequency interference in a plurality of receivers by a plurality of transmitters which comprises the steps of eliminating transmitter-receiver pairs which do not have a corresponding frequency, within predetermined tolerance, between one harmonic of the transmitter and one harmonic of the receiver of each of said pairs, determining the severity of the interference between the surviving transmitter-receiver pairs by assuming that all antennas are non-directional with gain equal to main beam gain, and determining the severity of the interference giving to the variation of antenna gain with azimuth for those pairs which are not eliminated by the last mentioned screening operation.

9. Circuit means for predicting radio frequency interference in a plurality of receivers by a plurality of transmitters which comprises means for eliminating transmitter-receiver pairs which do not have a corresponding frequency, within a predetermined tolerance, between one harmonic of the transmitter and one harmonic of the receiver of each of said pairs and means for determining the severity of the interference between the surviving transmitter-receiver pairs by assuming that all antennas are non-directional with gain equal to main beam gain.

10. Circuit means for predicting radio frequency interference in a plurality of receivers by a plurality of transmitters which comprises means for eliminating transmitter-receiver pairs which do not have a corresponding frequency, within predetermined tolerance, between one harmonic of the transmitter and one harmonic of the receiver of each of said pairs, means for determining the severity of the interference between the surviving transmitter-receiver pairs by assuming that all antennas are non-directional with gain equal to main beam gain, and means for determining the severity of the interference giving effect to the variation of antenna gain with azimuth for those pairs which are not eliminated by the last mentioned means.

11. Circuit means according to claim 10 and further including means for determining the interference-signal margin and the proportionate time that different severity of interference is expected to occur.

12. Circuit means according to claim 11 wherein the last mentioned means receives data as times of operation and as to the rates of rotation of the antennas.

13. Circuit means according to claim 10 wherein said second mentioned means receives data as to the characteristics of the transmission lines and the polarization and location of the transmitters and receivers.

14. Circuit means according to claim 9 wherein the severity determining means eliminate transmitter-receiver pairs when the interference power is less than the minimum discernible signal for the receiver plus a predetermined margin.

15. Interference prediction circuit means for eliminating a transmitter-receiver pair as non-interfering which comprises a first computer component selectively settable to the assigned operational frequency of the transmitter, a second computer component selectively settable to $b$ times the assigned operational frequency of the receiver and an algebraic adder connected at its input side to said first and second computer means for determining which computer means has the larger output.

16. Interference prediction circuit means according to claim 15 wherein $b$ is equal to 10.

17. Interference prediction circuit means for eliminating a transmitter-receiver pair as non-interfering which comprises a first computer component selectively settable to $b$ times the assigned operational frequency of the receiver, a second computer component selectively settable to $n$ times the assigned operational frequency of the transmitter and an algebraic adder connected at its input side to said first and second computer means for determining which computer means has the larger output, wherein $b$ equals 2 and $n$ equals, in succession 1, 2 . . . 8.

18. Interference prediction circuit means for eliminating a transmitter-receiver pair as non interfering which comprises a first computer means selectively settable to $b$ times the width of the tunable band of the receiver, a second computer means selectively settable to $g$ times the IF band pass of the receiver, a third computer means selectively settable to $cn$ times the width of the tunable band of the transmitter, a fourth computer means selectively settable to $m$ times the nominal signal bandwidth of the transmitter, a first adder connected at its input side to said first, second, third and fourth computer means, a fifth computer means selectively settable to $h$ times the assigned operational frequency of the receiver, a sixth computer means selectively settable to $n$ times the assigned operational frequency of the transmitter, a second adder connected at its input side to said fifth and sixth computer means for yielding an output equal to the difference between the outputs of said fifth and sixth computer means and a third adder connected at its input side to said first and second adders.

19. Interference prediction circuit means according to claim 18 wherein $b$ and $c$ are equal to ½, $h$ is equal to 1 $g$ is equal to 25 for $n$ equal to 1, 2 and 3, $g$ is equal to 5 for $n$ equal to 5, 6, 7 and 8, $m$ is equal to ½ for AM and PM when $n$ equals 1, 2 and 3, $m$ is equal to ½ $n$ for FM when $n$ equals 1, 2 and 3 and $m$ is equal to zero when $n$ equals 4, 5, 6, 7 and 8.

20. Interference prediction circuit means according to claim 18 wherein said second adder yields a signal opposite in polarity to the polarity of the signal of said first adder and said third adder is an algebraic adder.

21. Interference prediction circuit means according to claim 18 including a seventh computer means selectively settable to twice the center frequency of the IF passband of the receiver which is connected to the input sid of said second adder.

22. Interference prediction circuit means according to claim 18 wherein a seventh computer means selectively settable to $\Delta f$ is substituted for said fourth computer means, wherein:

$\Delta f$ is the incremental difference $f_{TK}-f_I'$, and $f_I'$ is a frequency of interest according to the type of modulation of the transmitter as determined by the formulas:

For AM:

$$\frac{0.8P'_{TK}f^3_{TMK}}{[|f_{TK}-f_I'|]^4}=0.001$$

For FM:

$$\frac{12.5P'_{TK}f^3_{TMK}}{[|f_{TK}-f_I'|]^4}=0.001$$

For PM:

$$\frac{0.823P'_{TK}}{H[|f_{TK}-f_I'|]^4}=0.001$$

in which $p'_{TK}$ is the nominal transmitter power in watts $f_{TMK}$ is the highest modulation frequency $f_{TK}$ is the assigned operational frequency 23. Interference prediction circuit means according to claim 22 including an eighth computer means selectively settable to twice the center frequency of the IF passband of the receiver which is connected to the input side of said second adder.

24. Method of predicting radio frequency interference in a plurality of receivers by a plurality of transmitters which comprises comparing for each transmitter-receiver pair the transmitter fundamental and harmonics thereof with the receiver image sensitivity.

25. Method of predicting radio frequency interference in a plurality of receivers by a plurality of transmitters which comprises comparing for each transmitter-receiver pair the transmitter spurious emissions with the receiver operational sensitivity.

26. Method of predicting radio frequency interference in a plurality of receivers by a plurality of transmitters which comprises comparing for each transmitter-receiver pair the transmitter spurious emissions with the receiver image sensitivity.

27. Method of predicting radio frequency interference in a plurality of receivers by a plurality of transmitters which comprises the steps of determining the interfering power at the receiver, determining the minimum discernible signal of the receiver and eliminating transmitter-receiver pairs as non-interfering when the interfering power is less than the receiver's minimum discernible signal by a predetermined margin.

28. Circuit means for predicting radio frequency interference in a plurality of receivers by a plurality of transmitters which comprises means for determining the interference power at the receiver, means for determining the minimum discernible signal of the receiver and means for eliminating transmitter-receiver pairs as non-interfering when the interfering power is less than the receiver's minimum discernible signal by a predetermined margin.

References Cited in the file of this patent

UNITED STATES PATENTS 2,980,330 Ablow et al. ------------ Apr. 18, 1961